Patented Apr. 18, 1950

2,504,436

UNITED STATES PATENT OFFICE 2,504,436

CATALYST FOR POLYMERIZING VINYL ACETATE

James A. McCoubrey and Mogens Kiar, Shawinigan Falls, Quebec, Canada, assignors to Shawinigan Chemicals Limited, Montreal, Quebec, Canada, a corporation of Canada No Drawing. Application March 14, 1947, Serial No. 734,866. In Canada September 14, 1946

1 Claim. (Cl. 260—89.1)

INTRODUCTION

This invention relates to polymerization catalysts for low viscosity polyvinyl acetate resins of improved quality and to processes for making the same, and to chewing gum bases or compositions embodying these resins.

PRIOR ART

One process for polymerizing vinyl acetate to obtain a product of low viscosity is disclosed in United States Patent 2,085,490, Blaikie. In this process, substantially pure vinyl acetate is reacted at reflux temperature in the presence of toluene, as a diluent, and an acetyl peroxide catalyst prepared as described in U. S. Patent 2,007,557, Blaikie, by reacting sodium perborate and acetic anhydride in a toluene solution, and filtering or decanting the catalyst from the insoluble residue. By this process polyvinyl acetate, free from bitterness, can be produced with viscosities as low as 1.5 centipoises.

Since the developments disclosed in the Blaikie patents, and with the increasing use of polyvinyl acetate as a chewing gum base, the requirements of the trade have become more exacting. Polyvinyl acetate is now required with low viscosities in a range from about 1.6 down to about 1.2 centipoises. To obtain these very low viscosities it is necessary to modify the process of the prior art either by adding aldehyde to the reaction charge or by using larger amounts of catalyst, much greater than expected, as indicated by the difference in catalyst used in Examples 5 and 6 where 2.3% acetyl peroxide on the vinyl acetate produced a viscosity of 1.5 centipoises and 6.6% acetyl peroxide on the vinyl acetate was required to lower the viscosity to 1.26 centipoises. Either of these modifications results in the product having a slightly bitter musty taste, usually associated with a slight yellow colour and acidity.

OBJECTS

An object of the invention is to provide a process for making low viscosity polyvinyl acetates lacking taste, odour and colour and therefore acceptable to the chewing gum trade. Other objects and advantages of this invention will become apparent from the following description and appended claim.

THE INVENTION

We have found that polyvinyl acetate of the required low viscosity, i. e., in the range from about 1.6 down to about 1.2 centipoises, which is free from taste and odour, with acidity not more than about 0.15% as acetic acid and colour as defined herein not more than 0.2 red, 0.5 yellow, can be prepared from commercial vinyl acetate, containing not more than about 0.05% acetaldehyde, by using an acetyl peroxide catalyst solution which has been washed with water till its acidity is below one per cent, as acetic acid, perferably below one half per cent. These good qualities are not merely a question of final acidity of the polyvinyl acetate. Polyvinyl acetate made with catalyst which has not been made according to the present invention can be washed with hot water in a mixture of suitable type till the acidity, as acetic acid, is much less than 0.15% but this procedure, though costly, is not effective in removing the taste.

While the improved colour and the lack of odour and taste of the polyvinyl acetate are associated with low acidity, we do not wish to limit ourselves to any hypothesis as to the mechanism by which the improvement is effected. For example, colour, odour, and taste may be due in part to impurities in the catalyst which are removed simultaneously with the acid, by washing.

CATALYST PREPARATION

The acetyl peroxide catalyst is prepared by reacting acetic anhydride, in the presence of toluene or vinyl acetate as solvent, with any suitable "per" compound. Those preferred are sodium perborate and hydrogen peroxide of 27½% or higher strength. The catalyst solution is then washed with water till its acidity is below one per cent, as acetic acid, preferably below one half per cent.

It should also be noted that in the commercial manufacture of low viscosity polymers it is preferable to use catalysts more concentrated than those of the prior art to avoid the use of excessive volumes of catalyst solution. It is therefore preferred to use catalyst solutions containing at least about 9% acetyl peroxide by weight, and they may contain up to about 33% acetyl peroxide or even more. Such concentrated catalysts, if not prepared according to the present invention, introduce more objectionable impurities per unit of catalyst into the polymer than the more dilute catalysts of the prior art.

POLYMERIZATION

In accordance with this invention the polymerization is carried out by any of the prior art processes using toluene as the diluent and catalyst prepared according to the invention. For the production of the high quality, low viscosity polymer of this invention, the ratio of diluent to monomer must not be less than about 1.0, and preferably it is greater than about 1.3. While high ratios reduce the amount of catalyst required, they also reduce the amount of monomer in a charge of given size, so that ratios above 3.5 are excluded from this invention and those below 1.8 are preferred.

The concentration of catalyst, expressed as acetyl peroxide based by weight on the monomer, is adjusted to give the desired viscosity and usually falls within the range from about 1.5% to about 6.5%. The amount required to give a polymer of 1.5 centipoises viscosity using specified diluent/monomer ratios is shown in the examples. For viscosities lower than about 1.5 centipoises greatly increased concentrations of catalyst are required as shown in Example 6, which makes the quality of the catalyst of superlative importance for these low viscosities.

The polymerization may be carried out as a batch operation or continuously. The viscosity of the polymer produced by continuous methods is somewhat lower than that produced by batch operation as is well known in the prior art.

USE OF POLYMER IN CHEWING GUM

The polyvinyl acetates of this invention form excellent complete or partial substitutes for gum chicle or other masticable resins now used as the essential constituents of chewing gum compositions. They may be readily incorporated with plasticizers, softeners, fillers, sugar, flavouring matter, or other compounding ingredients used in the trade. The use of polyvinyl acetates of low viscosity reduces the amount of expensive plasticizer required to make chewing gums of suitable texture and may even make the plasticizer unnecessary. Obviously, the freedom from taste and odour, and the low colour and acidity of the polymers of this invention are features essential to their use in chewing gum.

EXAMPLES

The following examples are given to illustrate the present invention.

Example 1.—Catalyst

In a suitable flask equipped with a stirrer and thermometer were placed 66 g. toluene
24 g. acetic anhydride
1 g. calcium hydroxide The flask was surrounded by a bath and the temperature of the contents maintained at 20°–25° C. during the portionwise addition of 12 grams of 27½% hydrogen peroxide. After completion of the addition, stirring was continued for one hour.

The material was decanted in a separatory funnel and the aqueous layer drawn off. The hydrocarbon layer was washed with three successive portions of water of about 50 ml. each; the acidity was then 0.1% as acetic acid. The catalyst solution so obtained contained 9.8% available oxygen calculated as acetyl peroxide.

The yield of acetyl peroxide falls off if temperatures above 25° C. are used, so that 35° C. is the upper limit for satisfactory commercial operation. Below 20° C. the rate of reaction is too slow to be practicable. Higher concentrations of catalyst, for example 33% acetyl peroxide, are readily made by increasing the amounts of hydrogen peroxide and anhydride. The optimum molar ratio of anhydride to hydrogen peroxide is 2:1.

Example 2.—Catalyst

In a 500 ml. round bottom flask equipped with a stirrer, thermometer, and a dropping funnel were placed 130 g. vinyl acetate
35 g. acetic anhydride
1 g. calcium hydroxide The flask was surrounded by a cooling bath, the stirrer started, and the temperature of the mix reduced to about 5° C. In the dropping funnel were placed 30 mls. of 27½% hydrogen peroxide which was slowly added to the contents of the flask, maintaining the temperature in the neighbourhood of 10° C.

Following the addition of the hydrogen peroxide the mix was stirred for ½ hr. at 10° C., then cooled to about 5° C., decanted into a separatory funnel and the vinyl acetate layer washed three or four times with ice water, which brought the acidity below 0.05% as acetic acid. The washes contained some acetyl peroxide as did the aqueous layer that separated when the material was decanted into the separatory funnel; these were destroyed with alkali, as a safety precaution.

The catalyst solution was stored in the dark at about 0° C. It contained 12.5% available oxygen calculated as acetyl peroxide.

During the addition of hydrogen peroxide to the other ingredients in the example, operation above 15° C. involves the risk of starting polymerization of the vinyl acetate, resulting in a sudden rise in temperature and a run-away reaction. When operating below 5° C., the rate of reaction is unduly slow.

Example 3.—Catalyst

In a kettle equipped with a stirrer and a cooling jacket were placed 66 lbs. toluene
65 lbs. sodium perborate ($NaBO_3 4H_2O$)

and to these were added, while stirring, 88 lbs. acetic anhydride in four successive portions, while maintaining the temperature between 25° and 30° C. After two hours from the first addition of anhydride, the charge was washed with three successive washes of 11 gallons each of water at about 35° C., which were separated by running off the lower layer after an adequate period of settling. The catalyst solution so obtained contained 31.3% available oxygen calculated as acetyl peroxide; its acidity was 0.1% as acetic acid.

If reaction temperatures above 30° C. are used the yield of acetyl peroxide is diminished; 35° C. is the upper limit for reasonable yields. The rate below 25° C. is too slow for commercial operation.

Example 4.—Polymer

In a 500 ml. round bottom flask, equipped with a thermometer and a stirrer operating through a brine cooled shaft condenser, were placed 100 g. vinyl acetate
133 g. toluene
2.3 g. acetyl peroxide (23.5 of catalyst of Ex. 1)

The stirrer was started and the flask was heated at a steady rate until refluxing commenced. Heating and/or cooling was then so adjusted that gentle refluxing was maintained; this was continued for about 3½ hours, at the end of which time the stirrer was disconnected, the flask connected to a steam line and all traces of solvent, unpolymerized vinyl acetate, and acetic acid from the decomposition of the catalyst were removed. The non-steam-distillable portion consisted of polyvinyl acetate. This material was then transferred to an aluminum boat or other suitable container and dried in a vacuum drier at 22" vacuum for 4 hrs. at a maximum temperature of 150° C. The polyvinyl acetate so obtained was clear and remarkably free from taste and odour. The colour was 0.1 red, 0.3 yellow; the acidity was 0.02% as acetic acid, and the viscosity of a molar solution in benzene was approximately 1.5 centipoises.

Example 5—Polymer

With the same apparatus and procedure as Example 4, the following charge was used 100 g. vinyl acetate
100 g. toluene
3.45 g. acetyl peroxide (35 g. catalyst of Ex. 1)

The polyvinyl acetate so obtained was clear and remarkably free from taste and odour. The colour was 0.1 red, 0.3 yellow; the acidity was 0.05% as acetic acid, and the viscosity was 1.5 centipoises.

Example 6.—Polymer

With the same apparatus and procedure as Example 4, the following charge was used 50 g. vinyl acetate
160 g. toluene
3.3 g. acetyl peroxide (10 g. catalyst made as in Ex. 1, containing 33% acetyl peroxide)

The polyvinyl acetate so obtained was clear and remarkably free from taste and odour. The color was 0.1 red, 0.4 yellow, the acidity was 0.06% as acetic acid, and its viscosity was 1.26 centipoises.

Measurement of colour and acidity of polyvinyl acetate

The colour measurements referred to herein are made in a Lovibond Tintometer using transmitted light which passes twice through a piece of polyvinyl acetate ½" thick. This is much more sensitive than simple visual inspection; for example, a sample of polyvinyl acetate which would be classed as water white has a colour of 0.1 red, 0.3 yellow, and the difference between this sample and one classed as 0.2 red, 0.5 yellow is difficult to detect visually.

The acidity is determined by dissolving at room temperature five grams of the resin in 100 ml. of aqueous methanol, 75% by volume, cooling to 0° C., and titrating with N/50 caustic soda using phenolphthalein as indicator. The acidity is calculated as acetic acid.

In order that there will not be any uncertainty as to the physical consistency of the polymers, it may be stated the viscosities herein mentioned are determined as follows:

The polymer is dissolved in benzene and made up so that at 20° C. one litre contains the simple molecular weight of polymer in grams. This is filtered into the apparatus through cotton-wool, precautions being taken to avoid loss of solvents. The time of outflow is then determined by the Oswald viscosimeter, which has been standardized on a pure solvent (benzene), of which the absolute viscosity is known in centipoises.

It will be understood that, without departing from the spirit of the invention or the scope of the claim, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

A process for preparing chewing gum grade polyvinyl acetate comprising mixing a catalyst solution, having from 9% to 33% by weight of acetyl peroxide, in a solvent of the group consisting of toluene and vinyl acetate, with a mixture of vinyl acetate, containing not more than 0.05% aldehyde and toluene under polymerizing conditions until the vinyl acetate has been substantially completely polymerized and recovering the polyvinyl acetate from the polymerization mixture, said polyvinyl acetate in a molar benzene solution at 20° C. having a viscosity within the range from 1.6 down to 1.2 cps., said catalyst solution being obtained by reacting acetic anhydride with a per-oxygen compound under agitation in the presence of a solvent from said group and at a temperature below that at which vinyl acetate polymerizes when said solvent is vinyl acetate and washing the solution with successive portions of water until its acidity is below 0.5% calculated as acetic acid, the amount of acetyl peroxide in said mixture of catalyst solution, vinyl acetate and toluene lying in the range of between about 1.5% and 6.6% by weight of the vinyl acetate, the ratio of toluene to vinyl acetate before polymerization lying in the range between about 1:1 and 3.5:1.

JAMES A. McCOUBREY.
MOGENS KIAR.

REFERENCES CITED

The following references are of record in the file of this patent:

UNITED STATES PATENTS

| Number | Name | Date |
|---|---|---|
| 2,007,557 | Blaikie et al. | July 9, 1935 |
| 2,085,490 | Blaikie | June 29, 1937 |

FOREIGN PATENTS

| Number | Country | Date |
|---|---|---|
| 387,335 | Great Britain | Jan. 27, 1933 |

OTHER REFERENCES

Clover et al., American Chemical Journal, vol. 19, January-June 1903, pages 182–184.

Brodie, Philosophical Transactions of the Royal Society of London, vol. 153, 1863, page 414.